United States Patent
Bennie et al.

(10) Patent No.: US 10,486,649 B1
(45) Date of Patent: Nov. 26, 2019

(54) VEHICLE SECURITY MONITORING IN A KEY-OFF STATE

(71) Applicant: Ford Global Technologies, LLC, Dearborn, MI (US)

(72) Inventors: Brian Bennie, Sterling Heights, MI (US); Mark Gehrke, Ypsilanti, MI (US); Jonathan Diedrich, Carleton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/208,492

(22) Filed: Dec. 3, 2018

(51) Int. Cl.
  *B60R 25/40* (2013.01)
  *B60R 25/10* (2013.01)
  *B60R 25/102* (2013.01)

(52) U.S. Cl.
  CPC ............ *B60R 25/40* (2013.01); *B60R 25/102* (2013.01); *B60R 25/1004* (2013.01)

(58) Field of Classification Search
  CPC .... B60R 25/40; B60R 25/1004; B60R 25/102
  USPC .................................................... 340/426.25
  See application file for complete search history.

(56) References Cited

U.S. PATENT DOCUMENTS

| | | | |
|---|---|---|---|
| 9,452,732 B1* | 9/2016 | Hermann | B60R 25/10 |
| 9,870,697 B2 | 1/2018 | Frew et al. | |
| 9,908,509 B2* | 3/2018 | Kawamura | B60R 25/24 |
| 10,017,156 B2 | 7/2018 | Etonye | |
| 2011/0149078 A1 | 6/2011 | Fan et al. | |
| 2018/0118166 A1* | 5/2018 | Mueller | B60R 25/40 |
| 2018/0154908 A1 | 6/2018 | Chen | |

FOREIGN PATENT DOCUMENTS

| | | |
|---|---|---|
| CN | 104670155 B | 8/2017 |
| CN | 107571840 A | 1/2018 |
| WO | WO 201463400 A1 | 5/2014 |

* cited by examiner

*Primary Examiner* — John A Tweel, Jr.
(74) *Attorney, Agent, or Firm* — Frank Lollo; Eversheds Sutherland (US) LLP

(57) ABSTRACT

Method and apparatus are disclosed for vehicle security monitoring in a key-off state. An example vehicle includes low-power sensors and high-power sensors for security monitoring, a communication module, and a controller. The controller is to, when in a key-off state, determine a first score based on the low-power sensors. The controller also is to, responsive the first score exceeding a first threshold, activate the high-power sensors and determine a second score based on the high-power sensors. The controller also is to, responsive the second score exceeding a second threshold, send an alert via the communication module.

20 Claims, 4 Drawing Sheets

VEHICLE SECURITY MONITORING IN A KEY-OFF STATE

TECHNICAL FIELD

The present disclosure generally relates to security monitoring and, more specifically, to vehicle security monitoring in a key-off state.

BACKGROUND

Vehicles typically include a plurality of electronic systems and/or devices that monitor and control various subsystems throughout the vehicle. For instance, some vehicles include security systems to detect if and when a crime and/or other security event is happening to the vehicle. Such security systems may include accelerometers, radar sensors, lidar sensors, ultrasonic sensors, cameras, and/or other sensors of the vehicles. In some instances, a security system of a vehicle emits an alarm using a horn of the vehicle to scare a potential perpetrator away.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle security monitoring in a key-off state. An example disclosed vehicle includes low-power sensors and high-power sensors for security monitoring, a communication module, and a controller. The controller is to, when in a key-off state, determine a first score based on the low-power sensors. The controller also is to, responsive the first score exceeding a first threshold, activate the high-power sensors and determine a second score based on the high-power sensors. The controller also is to, responsive the second score exceeding a second threshold, send an alert via the communication module.

Some examples further include an ignition switch and an ignition switch sensor. In such examples, the controller is to determine when the vehicle is in the key-off state based on the ignition switch sensor.

Some examples further include a battery and a battery sensor to measure an energy level of the battery. In some such examples, the high-power sensors are deactivated when the vehicle initially is in the key-off state to conserve energy consumption of the battery. In some such examples, the controller determines which of the low-power sensors to activate based on the energy level of the battery. In some such examples, the controller determines which of the high-power sensors to activate based on the energy level of the battery. Moreover, in some such examples, the controller is to identify a location of a security event based on data collected by the low-power sensors and determine which of the high-power sensors to activate based on the location.

In some examples, the low-power sensors include at least one of a microphone, an accelerometer, an ultrasonic sensor, a surface nanosensor, and a low-power camera and the high-power sensors include at least one of a radar sensor, a lidar sensor, and a camera. In some examples, the low-power sensors and the high-power sensors are configured to monitor an exterior of the vehicle, an adjacent vehicle, and an adjacent building.

Some examples further include a GPS receiver to identify a location of the vehicle. In such examples, the controller is to collect security data for the location via the communication module, determine the first score further based on the location, and determine the second score further based on the location.

Some examples further include memory configured to store a recording of a security event in response to the controller determining that the second score exceeds the second threshold.

In some examples, the controller activates the high-power sensors for a predefined duration responsive the first score exceeding the first threshold and deactivates the high-power sensors when the predefined duration has been completed.

An example disclosed system includes a vehicle. The vehicle includes low-power sensors, high-power sensors, and a controller. The controller is to, when in a key-off state, determine a first score based on the low-power sensors. The controller also is to activate the high-power sensors based on the first score, and transmit data of the high-power sensors. The example disclosed system also includes a remote device to determine a second score based on the data and transmit an alert based on the second score.

In some examples, to activate the high-power sensors based on the first score, the controller is to activate the high-power sensors responsive to determining that the first score exceeds a first threshold. In some such examples, to transmit the alert based on the second score, the controller is to activate the transmit the alert responsive to determining that the second score exceeds a second threshold.

In some examples, the remote device includes a remote server. In some examples, the remote device includes a mobile device. In some examples, the vehicle includes a communication module and the controller transmits the data of the high-power sensors via the communication module. In some examples, the remote device includes memory configured to store a recording of a security event in response to the remote device determining that the second score exceeds a second threshold.

An example disclosed method includes, when a vehicle is in a key-off state, determining, via a processor, a first score based on data collected by a vehicle low-power sensor. The example disclosed method also includes activating a vehicle high-power sensor upon determining, via the processor, the first score exceeds a first threshold. The example disclosed method also includes determining a second score based on data collected by the vehicle high-power sensor and sending an alert upon determining the second score exceeds a second threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
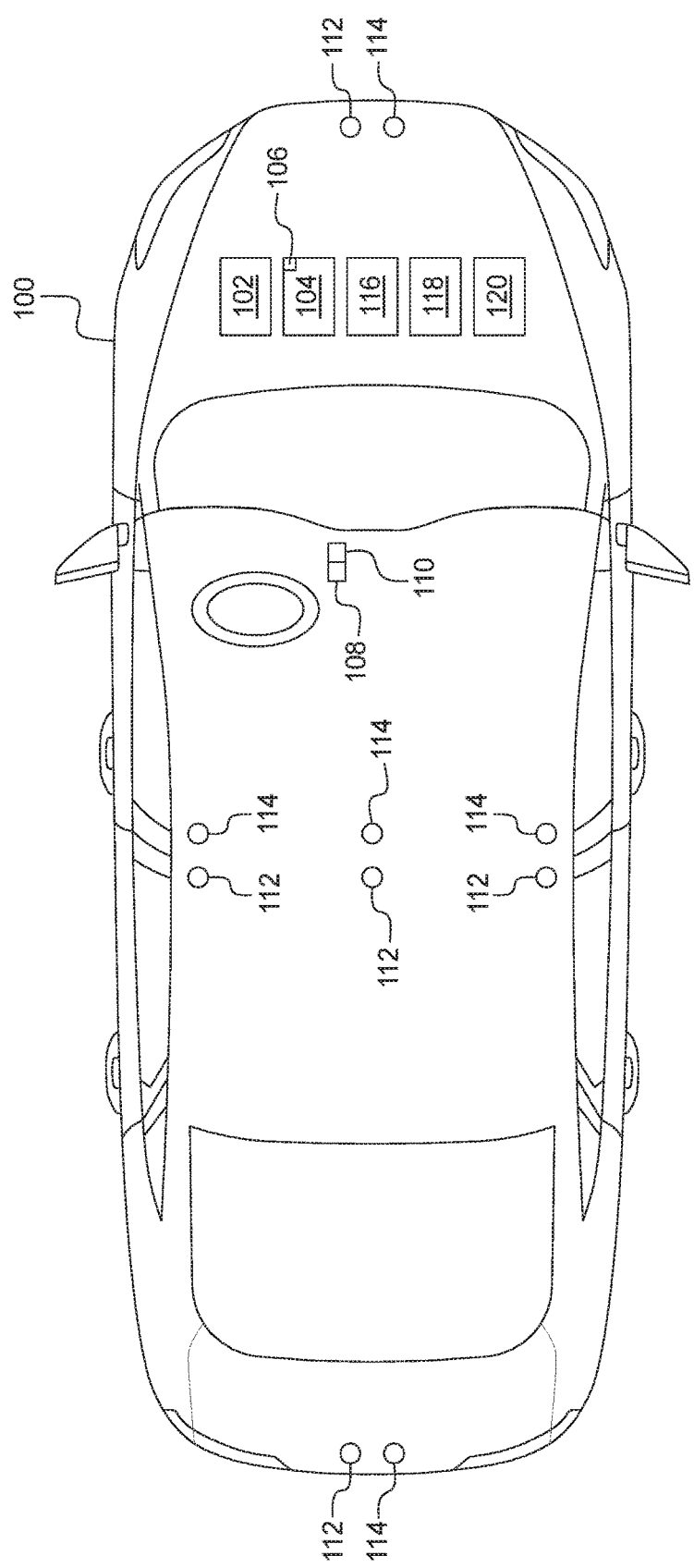
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically include a plurality of electronic systems and/or devices that monitor and control various subsystems throughout the vehicle. For instance, some vehicles include security systems to detect if and when a crime and/or other security event is happening to the vehicle. Such security systems may include accelerometers, radar sensors, lidar sensors, ultrasonic sensors, cameras, and/or other sensors of the vehicles. In some instances, a security system of a vehicle emits an alarm using a horn of the vehicle to scare a potential perpetrator away.

Typically, sensors of a vehicle require energy to operate and monitor the vehicle and/or its surrounding area. For example, a camera consumes energy in order to collect image(s) and/or video of the vehicle and/or its surrounding area. In instances in which the vehicle is in a key-off state (i.e., an engine of the vehicle is turned off), electronic devices such as sensors may draw energy from a battery (e.g., a starter battery) of the vehicle. In such instances, the battery may become discharged or drained if electronic devices are drawing too much energy from over a period of time while the vehicle is in the key-off state.

Example methods and apparatus disclosed herein include an energy-efficient security system of a vehicle that reduces a risk of discharging a battery when the vehicle is in a key-off state. When the vehicle is in a key-off state, low-power sensors (e.g., a microphone, an accelerometer, an ultrasonic sensor, a low-power camera, etc.) collect data. A controller of the vehicle collects the data from the low-power sensors. The controller may also collect other data related to a location of the vehicle (e.g., a GPS location, a time-of-day, crime data, etc.). The controller determines a first security score or value by utilizing an artificial intelligence (AI) algorithm to analyze the collected data (e.g., the low-power sensor data, the locational data, etc.). The first security score corresponds with a likelihood that a crime (e.g., theft, vandalism, etc.) and/or other security event is occurring at and/or adjacent to the vehicle.

If the controller determines that the first security score exceeds a first predetermined threshold, the controller temporarily activates high-power sensors of the vehicle (e.g., a camera, a radar sensor, a lidar sensor) for a predefined duration of time to collect additional data. In some examples, the controller determines a second security score or value by utilizing the AI algorithm to analyze the collected data (e.g., the high-power sensor data, the low-power sensor data, the locational data, the first security score, etc.). In other examples, the controller transmits the collected data (e.g., the high-power sensor data, the low-power sensor data, the locational data, the first security score, etc.) to a remote device (e.g., a remote server, a mobile device), and the remote device determines the second security score by utilizing an AI algorithm to analyze the collected data. The second security score also corresponds with a likelihood that a crime and/or other security event is occurring at and/or adjacent to the vehicle. If the second security score exceeds a second predetermined threshold, the controller and/or the remote device (1) stores the collected data (e.g., image(s) and/or video collected by a vehicle cameras) to facilitate identification of a perpetrator at a later time and/or (2) sends a notification in real-time to an operator of the vehicle and/or a third-party security service.

Other examples disclosed herein include an energy-efficient security system for real property, such as a building. The security system includes low-power sensors that collect data continually and/or at regular predefined intervals. A controller collects the data from the low-power sensors. The controller may also collect other data related to a location of the building. The controller determines a first security score or value by utilizing an AI algorithm to analyze the collected data. If the controller determines that the first security score exceeds a first predetermined threshold, the controller temporarily activates high-power sensors of the building for a predefined duration of time to collect additional data. In some examples, the controller determines a second security score or value for the building and/or a surrounding area by utilizing the AI algorithm to analyze the collected data. In other examples, the controller transmits the collected data to a remote device, and the remote device determines the second security score by utilizing an AI algorithm to analyze the collected data. If the second security score exceeds a second predetermined threshold, the controller and/or the remote device (1) stores the collected data to facilitate identification of a perpetrator and/or (2) sends a notification in real-time to a security service.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes an engine 102 and a battery 104. The engine 102 includes an internal combustion engine, an electric motor, a hybrid engine and/or any other power source that propels movement of the vehicle 100. In some examples, the battery 104 is a starter battery that provides energy to activate an internal combustion engine of the engine 102. Once activated, power is supplied to the internal combustion engine via an alternator to propel the vehicle 100. Further, in some examples, the battery 104 provides electricity to an electric motor of the engine 102 to enable the electric motor to propel the vehicle 100. In such examples, the battery 104 may include a single battery cell and/or a battery pack that includes a plurality of battery cells connected together.

Figure 3:
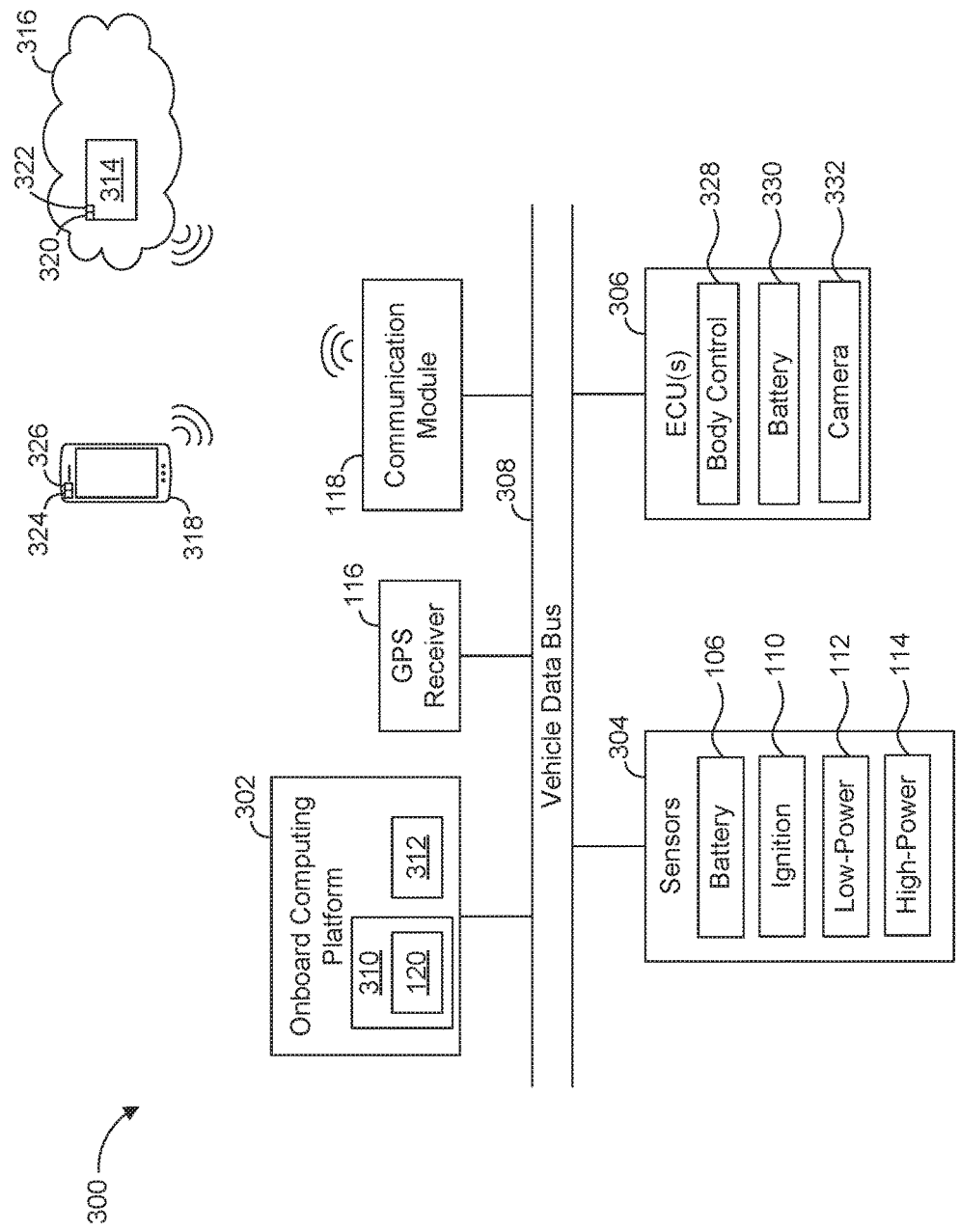
FIG. 3 is a block diagram of electronic components of the vehicle of FIG. 1.

The vehicle 100 of the illustrated example also includes a battery sensor 106 (e.g., of a battery management system 330 of FIG. 3). The battery sensor 106 is configured to monitor characteristics of the battery 104 of the vehicle 100. The battery sensor 106 detects and/or otherwise determines a current, a voltage, a charge level, and/or a temperature of the battery 104. For example, the battery sensor 106 detects that the charge level is decreasing as the battery sensor 106 is being discharged. In some examples, the battery sensor 106 is attached to a lead of the battery 104 to enable the battery sensor 106 to collect measurements of the charge level and/or other characteristics of the battery 104.

In the illustrated example, the vehicle 100 also includes an ignition switch 108 and an ignition switch sensor 110. The ignition switch 108 enables an operator of the vehicle 100 (e.g., a driver) to operate the engine 102, the battery 104, and/or electronic accessories of the vehicle 100. For example, the ignition switch 108 includes an on-position, a start position, and an off-position. In some examples, the ignition switch 108 is a rotary switch and/or a pushbutton that transitions between the ignition switch positions (e.g., the on-position, the start position, the off-position, the accessory position). The ignition switch sensor 110 detects a position of the ignition switch 108. For example, the ignition switch sensor 110 detects whether the ignition switch 108 is in the on-position, the start position, the off-position, or the accessory position. In such examples, the ignition switch sensor 110 detects that the vehicle 100 is in a key-off state when the ignition switch 108 is in the off-position.

The vehicle 100 of the illustrated example also includes one or more low-power sensors 112, one or more high-power sensors 114, and a global positioning system (GPS) receiver 116. The low-power sensors 112 consume significantly less energy to operate than the high-power sensors 114. For example, the low-power sensors 112 include microphone(s), accelerometer(s), ultrasonic sensor(s), nano-sensor(s) located along a vehicle surface, low-power camera(s), ultra-low-level camera(s), and/or any other sensor(s) that are configured to consume low levels of energy during operation. The high-power sensor(s) include radar sensor(s), lidar sensor(s), standard-resolution camera(s), high-resolution camera(s) and/or any other sensor(s) or camera(s) that are configured to consume relatively higher levels of energy during operation. Further, the low-power sensors 112 and the high-power sensors 114 are positioned to monitor properties of an exterior of the vehicle 100 and/or an surrounding environment of the vehicle 100. For example, the low-power sensors 112 and the high-power sensors 114 are configured to monitor the security of the vehicle 100 and/or other object(s) (e.g., another vehicle, a building, etc.) in proximity of the vehicle 100. In the illustrated example, the low-power sensors 112 and the high-power sensors 114 are configured to collect data that is analyzed (e.g., via an artificial intelligence algorithm) to identify a risk of the vehicle 100, an adjacent vehicle, and/or an adjacent building being vandalized, burglarized, and/or stolen. Further, the GPS receiver 116 receives a signal from a global positioning system to identify a location of the vehicle 100. In some examples, the current location of the vehicle 100 is utilized to identify a risk of the vehicle 100, an adjacent vehicle, and/or an adjacent building being vandalized, burglarized, and/or stolen.

Further, the vehicle 100 includes a communication module 118 that includes wired or wireless network interfaces to enable communication with other devices (e.g., a remote devices). Further, the communication module 118 also includes hardware (e.g., processors, memory, storage, antenna, etc.) and software to control the wired or wireless network interfaces. For example, the communication module is configured to wirelessly communicate with external network(s). The external network(s) may be a public network, such as the Internet; a private network, such as an intranet; or combinations thereof, and may utilize a variety of networking protocols now available or later developed including, but not limited to, TCP/IP-based networking protocols. In the illustrated example, the communication module 118 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.).

Further, in the illustrated example, the communication module 118 also is configured to wirelessly communicate with nearby device(s), such as a mobile device (e.g., a smart phone, a wearable, a smart watch, a tablet, etc.). For example, the communication module 118 is configured to utilize a wireless personal area network (WPAN) to wirelessly communicate with nearby mobile device(s) via short-range wireless communication protocol(s), such as Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication protocol(s) may include Wi-Fi®, Near Field Communication (NFC), ultra-wide band (UWB) communication, ultra-high frequency (UHF) communication, low frequency (LF) communication, and/or any other communication protocol that enables the communication module 118 to communicatively couple with nearby device(s). Further, in some such examples, the communication module 118 may communicate with the external network via the coupled mobile device.

The vehicle 100 of FIG. 1 also includes a security controller 120 that is configured to monitor the security of the vehicle 100 and/or other nearby object(s) (e.g., other vehicle(s), real property such as building(s), etc.) when the vehicle 100 is in a key-off state. For example, the security controller 120 determines when the vehicle 100 is in the key-off state based on data collected by the ignition switch sensor 110. When the vehicle 100 transitions to the key-off state, the security controller 120 is configured to initially set the high-power sensors 114 in a deactivated stated to reduce an amount of energy that is drawn from the battery 104 in the key-off state to prevent the battery 104 from becoming fully discharged. The security controller 120 also is configured to set one or more of the low-power sensors 112 in an activated state to enable those of the low-power sensors 112 to collect data at reduced energy-consumption rates for monitoring the security of the vehicle 100 and/or other nearby object(s) without fully discharging the battery 104.

Further, when the vehicle 100 is in the key-off state, the security controller 120 is configured to determine (e.g., utilizing an AI algorithm) a first security score or value based on, at least in part, the data collected by the low-power sensors 112. The first security score corresponds with a confidence level or likelihood that a crime and/or other security event is occurring. The security controller 120 is configured to subsequently compare the first security score to a first predefined threshold. In response to determining that the first security score is greater than the first predefined threshold, the security controller 120 is configured to activate one or more of the high-power sensors 114. For example, the security controller 120 activates one or more of the high-power sensors 114 by sending a signal (e.g., to a corresponding electronic control unit of the vehicle 100) to instruct those of the high-power sensors 114 to do so. The security controller 120 of the illustrated example is configured to keep the high-power sensors 114 deactivated state until the first security score exceeds the first predefined threshold to reduce the amount of energy consumed to monitor security while the vehicle 100 is in the key-off state. Further, while the vehicle 100 is in the key-off state, the security controller 120 is configured to activate the high-power sensors 114 when the first security score exceeds the first predefined threshold to enable the high-power sensors 114 to temporarily collect higher resolution and/or more robust data for monitoring the security of the vehicle 100 and/or other nearby object(s).

In some examples, once the high-power sensors 114 have been activated and collected data, the security controller 120 is configured to determine (e.g., utilizing an AI algorithm) a second security score or value based on, at least in part, the data collected by the high-power sensors 114. The second security score corresponds with a confidence level or likelihood that a crime and/or other security event is occurring. Further, the security controller 120 is configured to subsequently compare the second security score to a second predefined threshold. For example, the second predefined threshold is greater than the first predefined threshold. In response to determining that the second security score is greater than the second predefined threshold, the security controller 120 is configured to (1) transmit an alert via the communication module 118 to an operator of the vehicle 100 and/or a third-party security service and/or (2) store a recording of a security event and corresponding data collected by the low-power sensors 112 and/or the high-power sensors 114 to facilitate identification of a perpetrator at a later time.

Additionally or alternatively, the security controller 120 is configured to transmit the data collected by the high-power sensors 114 and/or other sources (e.g., the low-power sensors 112) to a remote device (e.g., a remote server 314 of FIG. 3, a mobile device 318 of FIG. 3) via the communication module 118 of the vehicle 100. Upon receiving the collected data, the remote device is configured to determine (e.g., utilizing an AI algorithm) the second security score or value based on, at least in part, the data collected by the high-power sensors 114. In such examples, the remote device is configured to subsequently compare the second security score to the second predefined threshold. In response to determining that the second security score is greater than the second predefined threshold, the remote device is configured to (1) transmit an alert to an operator and/or third-party security service and/or (2) store a recording of a security event and the corresponding data.

By sending the data collected by the high-power sensors 114 and/or other sources to the remote device for subsequent analysis by the remote device, the security controller 120 of the illustrated example potentially further reduces the amount of energy drained from the battery 104 while the vehicle 100 is in the key-off state. For instance, analyzing the data collected by the high-power sensors 114 potentially may be more energy-intensive than analysis of the low-power sensors 112. By analyzing the data of the low-power sensors 112 and sending the data of the high-power sensors 114 to remote device for analysis, the security controller 120 reduces the amount of energy that is consumed from the battery 104 in order to monitor the security of the vehicle 100 and/or a surrounding area when the vehicle 100 is in a key-off state.

Figure 2:
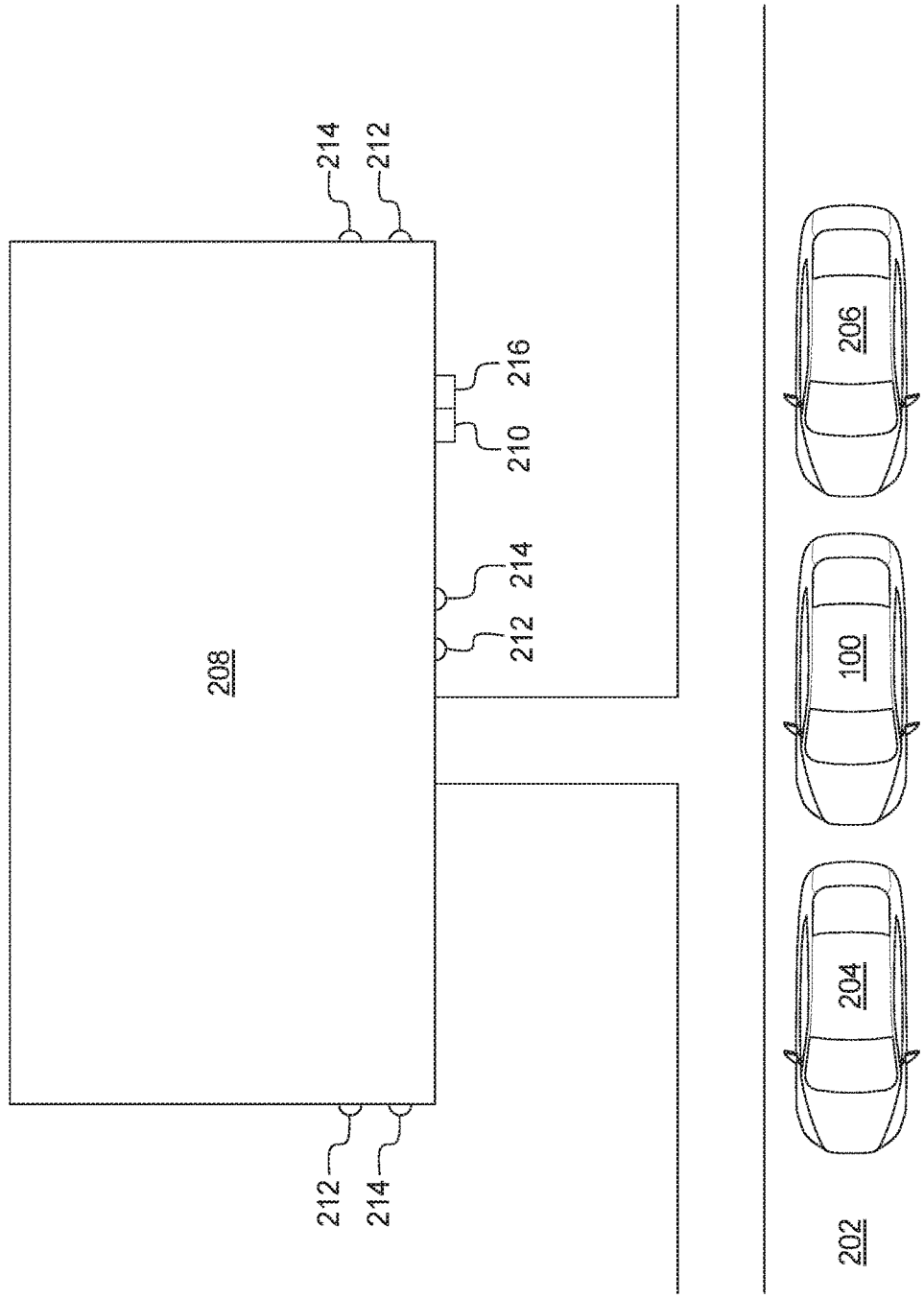
FIG. 2 depicts the vehicle of FIG. 1 parked in a key-off state.

FIG. 2 depicts the vehicle 100 parked in a key-off state. As illustrated in FIG. 2, the vehicle 100 is parked along a side of a road 202 adjacent a vehicle 204, another vehicle 206, and a building 208. The low-power sensors 112 and the high-power sensors 114 of the vehicle 100 are configured to monitor the security of the vehicle 100 (e.g., an exterior and/or interior of the vehicle 100), the vehicle 204, the vehicle 206, the building 208, and/or any other nearby objects within a surrounding area of the vehicle 100.

In operation, the security controller 120 determines that the vehicle 100 is in the key-off state via the ignition switch sensor 110. When the security controller 120 determines that the vehicle 100 is in the key-off state, the security controller 120 sets the high-power sensors 114 in a deactivated state. Further, the security controller 120 sets one or more of the low-power sensors 112 in an activated state. When the low-power sensors 112 are activated, the low-power sensors 112 collect data related to the security of the vehicle 100 and/or the surrounding area. The low-power sensors 112 collect data before the high-power sensors 114 are activated to conserve energy consumption of the battery 104 while the vehicle 100 is in the key-off state.

In some examples, the security controller 120 determines which of the low-power sensors 112 to activate based on a charge level of the battery 104 as measured by the battery sensor 106. For example, the security controller 120 activates more of the low-power sensors 112 when the charge level is high (e.g., fully charged) and activates less of low-power sensors 112 when the charge level is low (e.g., nearly discharged). Additionally or alternatively, the security controller 120 determines which of the low-power sensors 112 to activate based on the energy-consumption rates of the low-power sensors 112. For example, when the charge level of the battery 104 is less than full, the security controller 120 activates those of the low-power sensors 112 associated with relatively lower energy-consumption rates and deactivates those associated with relatively higher energy-consumption rates.

Further, in some examples, the security controller 120 also collects other data, such as location-based data, immediately before and/or while the vehicle 100 is in the key-off state. For example, the security controller 120 collects the current location of the vehicle 100 via the GPS receiver 116. In such examples, the security controller 120 collects security or crime data from a remote server (e.g., the remote server 314 of FIG. 3) via the communication module 118 based the current location and/or time-of-day. The security or crime data reflects a security risk level associated with the current location of the vehicle and/or the current time-of-day.

Further, the security controller 120 determines a first security value based on the collected data. For example, the security controller 120 determines the first security value, which corresponds with a confidence level or likelihood that a crime and/or other security event is occurring, based on data collected by the low-power sensors 112 and/or the location-based data. In some examples, the security controller 120 utilizes an AI algorithm that is stored in onboard memory (e.g., memory 312 of FIG. 3) to determine the first security value based on the collected data. For example, the security controller 120 utilizes a machine learning algorithm (e.g., a deep neural network) to determine the first security value based on the collected data. Machine learning algorithms are a form of AI algorithms that enable a system to automatically learn and improve from experience without being explicitly programmed by a programmer for a particular function. For example, machine learning algorithms access data (e.g., low-power sensor data, location based data, high-power sensor data, etc.) and learn from the accessed data to improve performance of a particular function (e.g., determining a security value). Example machine learning algorithms include artificial neural networks (e.g., deep neural networks), k-means clustering, Markov models, principal component analysis, decision trees, support vectors, Bayesian networks, sparse dictionary learning, rules-based machine learning, and/or any other pattern recognition algorithm.

Upon determining the first security value, the security controller 120 determines whether the first security value is greater than a first predefined threshold. If the first security value is less than or equal to the first predefined threshold, the security controller 120 continues to monitor the security of the vehicle 100 and/or the surrounding area via the low-power sensors 112 without activating the high-power sensors 114. If the first security value is greater than the first predefined threshold, the security controller 120 activates one or more of the high-power sensors 114. For example, the security controller 120 activates the high-power sensors 114 for a predefined duration of time upon determining that the first security value exceeds the first predefined threshold. While activated, the high-power sensors 114 collect data for security monitoring. The security controller 120 again deactivates the high-power sensors 114 when the predefined duration of time has been reached.

In some examples, the security controller 120 determines which of the high-power sensors 114 to activate based on a charge level of the battery 104 as measured by the battery sensor 106. For example, the security controller 120 activates more of the high-power sensors 114 when the charge level is high (e.g., fully charged) and activates less of high-power sensors 114 when the charge level is low (e.g., nearly discharged). Additionally or alternatively, the security controller 120 determines which of the high-power sensors 114 to activate based on the energy-consumption rates of the high-power sensors 114. For example, when the charge level of the battery 104 is less than full, the security controller 120 activates those of the high-power sensors 114 associated with relatively lower energy-consumption rates and keeps those with relatively higher energy-consumption rates deactivated. Further, in some examples, the security controller 120 determines which of the high-power sensors 114 to activate based on a direction of a potential security risk. That is, the security controller 120 identifies a location of a security event (e.g., on and/or adjacent to the vehicle 100) based on data collected by the low-power sensors 112 and determines which of the high-power sensors 114 to activate based on that location. For example, if the security controller 120 detects, based on the data collected by the low-power sensors 112, that there is a potential security risk at a rear of the vehicle 100, the security controller 120 activates those of the high-power sensors 114 toward the rear of the vehicle 100 and keeps those positioned away from the rear of the vehicle 100 deactivated.

In some examples, once the high-power sensors 114 have collected data, the security controller 120 determines a second security score based on, at least in part, the data collected by the high-power sensors 114. The security controller 120 may also determine the second security score further based on the data collected by the high-power sensors 114, the location-based data (e.g., the current location, corresponding crime data, etc.), and/or the first security score. Further, the security controller 120 subsequently compares the second security score to a second predefined threshold. In response to determining that the second security score is greater than the second predefined threshold, the security controller 120 (1) transmits an alert via the communication module 118 to an operator of the vehicle 100 and/or a third-party security service and/or (2) stores a recording of a security event and corresponding data collected by the low-power sensors 112 and/or the high-power sensors 114 to facilitate identification of a perpetrator at a later time. For example, the security controller 120 stores the security event recording and the corresponding data in onboard memory (e.g., memory 312 of FIG. 3) and/or transmits the data via the communication module 118 for storage in memory at a remote location (e.g., memory 322 of FIG. 3, memory 326 of FIG. 3).

Additionally or alternatively, the security controller 120 transmits the data collected by the high-power sensors 114 and/or other sources (e.g., the low-power sensors 112, the GPS receiver 116, a server) to a remote device (e.g., a remote server 314 of FIG. 3, a mobile device 318 of FIG. 3) via the communication module 118 of the vehicle 100. Upon receiving the collected data, the remote device determines (e.g., utilizing an AI algorithm) the second security score based on the collected data. In such examples, the remote device subsequently compares the second security score to the second predefined threshold. In response to determining that the second security score is greater than the second predefined threshold, the remote device (1) transmits an alert to an operator and/or third-party security service and/or (2) stores a recording of a security event and the corresponding data. For example, the remote device includes memory (e.g., the memory 322 of the remote server 314, the memory 326 of the mobile device 318).

Further, in the illustrated example, the building 208 includes a security monitoring system that is substantially similar to that of the vehicle 100. The security monitoring system of the building 208 includes components that are identical or substantially similar to those of the security monitoring system of the vehicle 100. For example, the security monitoring system of the building 208 includes a security controller 210, low-power sensors 212, high-power sensors 214, and a communication module 216 that are substantially similar or identical to the security controller 210, the low-power sensors 212, the high-power sensors 214, and the communication module 118, respectively, of the vehicle 100 as disclosed above with respect FIGS. 1-2.

For example, the low-power sensors 212 are activated to collect data continually and/or at regular predefined intervals. The security controller 210 collects the data from the low-power sensors 212. Additionally or alternatively, the security controller 210 collects location-based data (e.g., crime data). The security controller 210 analyzes the collected data (e.g., utilizing an AI algorithm) to determine a first security score. If the security controller 210 determines that the first security score exceeds a first predetermined threshold, the security controller 210 temporarily activates one or more of the high-power sensors 214 of the building 208 for a predefined duration of time to collect additional data. In some examples, the security controller 210 analyzes the collected data (e.g., utilizing the AI algorithm) to determine a second security score. In other examples, the security controller 210 transmits the collected data to a remote device (e.g., the remote server 314, the mobile device 318), and the remote device analyzes the data (e.g., utilizing the AI algorithm) to determine the second security score. If the second security score exceeds a second predetermined threshold, the security controller 210 and/or the remote device (1) stores the collected data to facilitate identification of a perpetrator and/or (2) sends a notification in real-time to a security service.

FIG. 3 is a block diagram of electronic components 300 of the vehicle 100. In the illustrated example, the electronic components 300 include an onboard computing platform 302, the GPS receiver 116, the communication module 118, sensors 304, electronic control units (ECUs) 306, and a vehicle data bus 308.

The onboard computing platform 302 includes a processor 310 (also referred to as a microcontroller unit and a controller) and memory 312. In the illustrated example, the processor 310 of the onboard computing platform 302 is structured to include the security controller 120. In other examples, the security controller 120 is incorporated into another ECU with its own processor and memory. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the communication module 118 is configured to wirelessly communicate with a remote server 314 of a network 316 (e.g., a cloud server) and/or a mobile device 318 (e.g., a smartphone, a tablet, a wearable, a smart watch, etc.). For example, the communication module 118 is configured to send an alert to (1) the mobile device 318 to notify an operator of the vehicle of a potential security risk and/or (2) the remote server 314 to notify a third-party security service of the potential security risk. Additionally or alternatively, the communication module 118 is configured to send data collected by the security controller 120 of the vehicle 100 (e.g., low-power sensor data, high-power sensor data, location-based data, etc.) to the remote server 314 and/or the mobile device 318 for subsequent analysis. In the illustrated example, the remote server 314 includes a processor 320 and memory 322, and the mobile device 318 includes a processor 324 and memory 326. For example, after the remote server 314 receives the collected data via the communication module 118 of the vehicle, the processor 320 of the remote server 314 analyzes the collected data utilizing an algorithm (e.g., an AI algorithm such as a machine learning algorithm) stored in the memory 322 to determine whether there is a security risk to the vehicle 100 and/or a corresponding surrounding area. Additionally or alternatively, after the mobile device 318 receives the collected data via the communication module 118 of the vehicle, the processor 324 of the mobile device 318 analyzes the collected data utilizing an algorithm (e.g., an AI algorithm such as a machine learning algorithm) stored in the memory 326 to determine whether there is a security risk to the vehicle 100 and/or a corresponding surrounding area.

The processor 320 and the processor 324 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 322 and the memory 326 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 322 and/or the memory 326 includes multiple kinds of memory, particularly volatile memory and non-volatile memory.

The memory 322 and the memory 326 are computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 322, the memory 326, the computer readable medium, within the processor 320, and/or within the processor 324 during execution of the instructions.

The sensors 304 are arranged in and/or around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include odometers, tachometers, pitch and yaw sensors, wheel speed sensors, microphones, tire pressure sensors, biometric sensors and/or sensors of any other suitable type. In the illustrated example, the sensors 304 include the battery sensor 106, the ignition switch sensor 110, the low-power sensors 112, and the high-power sensors 114.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have dozens of the ECUs 306 that are positioned in various locations around the vehicle 100 and are communicatively coupled by the vehicle data bus 308.

In the illustrated example, the ECUs 306 include a body control module 328, a battery management system 330, and a camera module 332. The body control module 328 controls one or more subsystems throughout the vehicle 100, such as power windows, power locks, an immobilizer system, power mirrors, etc. For example, the body control module 328 includes circuits that drive one or more of relays (e.g., to control wiper fluid, etc.), brushed direct current (DC) motors (e.g., to control power seats, power locks, power windows, wipers, etc.), stepper motors, LEDs, etc. The battery management system 330 of the illustrated example control(s) monitoring and operation of the battery 104 and/or alternative power source(s) of the vehicle 100. For example, the battery management system 330 includes and/or is communicatively coupled to the battery sensor 106 that monitors the charge level of the battery 104. Further, the camera module 332 of the illustrated example controls one or more cameras (e.g., one or more of the low-power sensors 112 and/or the high-power sensors 114 to collect image(s) and/or video that are utilized to monitor the security of the vehicle 100, nearby object(s) (e.g., other vehicles, buildings, etc.) and/or the surrounding area.

The vehicle data bus 308 communicatively couples the GPS receiver 116, the communication module 118, the onboard computing platform 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
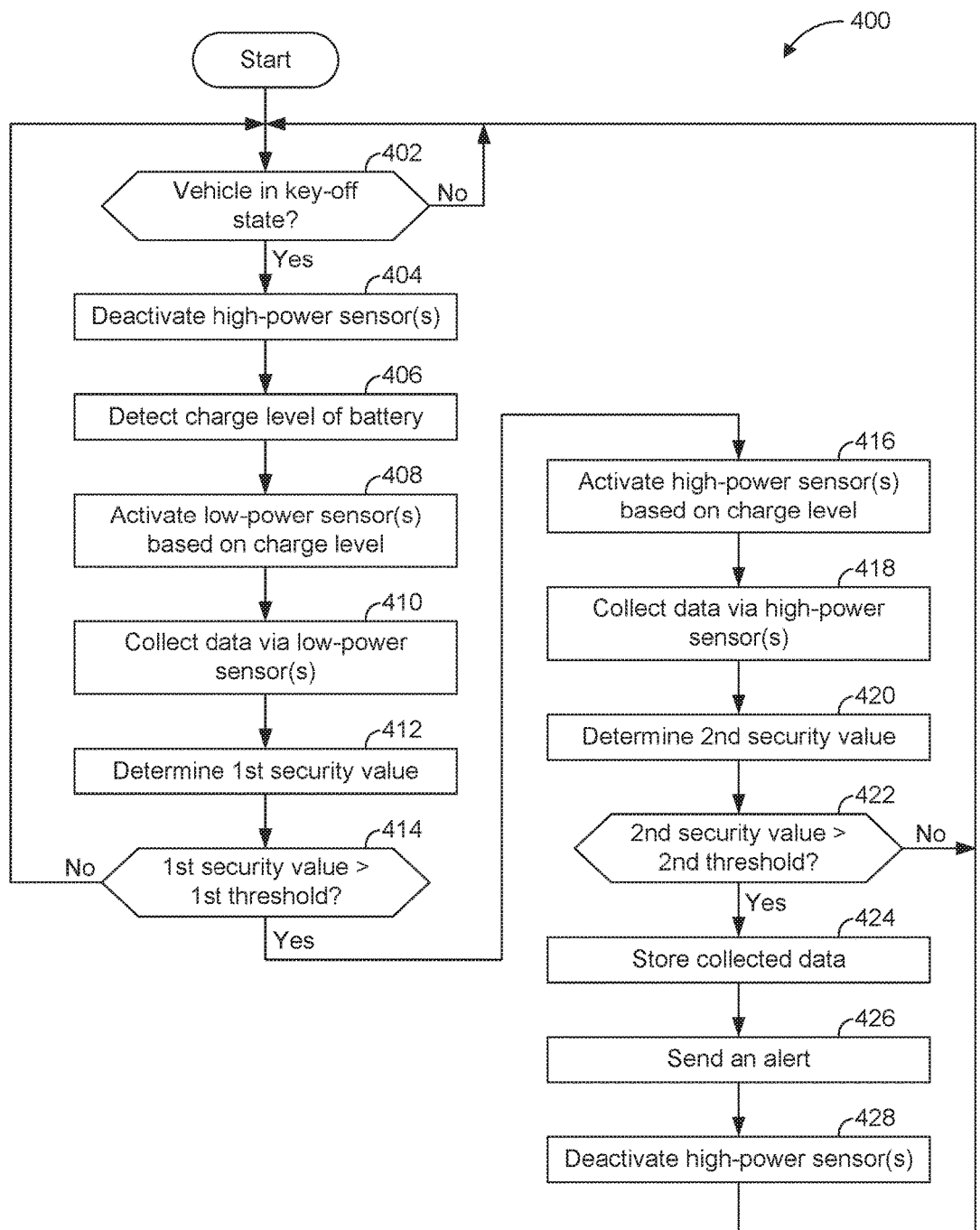
FIG. 4 is a flowchart for monitoring the security of a vehicle in a key-off state in accordance with the teachings herein.

FIG. 4 is a flowchart of an example method 400 to monitor the security of a vehicle. The flowchart of FIG. 4 is representative of machine readable instructions that are stored in memory (such as the memory 312, the memory 322, and/or the memory 326 of FIG. 3) and include one or more programs which, when executed by a processor (such as the processor 310, the processor 320, and/or the processor 324 of FIG. 3), cause the vehicle 100, the remote server 314, and/or the mobile device 318 to implement the example security controller 120 of FIGS. 1 and 3. While the example program is described with reference to the flowchart illustrated in FIG. 4, many other methods of implementing the example security controller 120 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the security controller 120 determines whether the vehicle 100 is in a key-off state. For example, the security controller 120 determines an operating state of the vehicle 100 via the ignition switch sensor 110. In response to the security controller 120 determining that the vehicle 100 is not in the key-off state, the method 400 remains at block 402. Otherwise, in response to the security controller 120 determining that the vehicle 100 is in the key-off state, the method 400 proceeds to block 404 at which the security controller 120 sets the high-power sensors 114 in a deactivated state.

At block 406, the security controller 120 determines a charge level of the battery 104. For example, the battery sensor 106 detects the charge level of the battery 104, and the security controller 120 collects the charge level from the battery sensor 106. At block 408, the security controller 120 sets one or more of the low-power sensors 112 in an activated state. In some examples, the security controller 120 determines which of the low-power sensors 112 to set in the activated state based on the charge level of the battery 104. For example, the security controller 120 activates more of the low-power sensors 112 when the charge level is high and less of low-power sensors 112 when the charge level is low. At block 410, the security controller 120 collects data via the low-power sensors 112 that are active. Additionally or alternatively, the security controller 120 collects other data. For example, the security controller 120 collects data related to the location of the vehicle 100 (e.g., a GPS location, a time-of-day, crime data, etc.) from the remote server 314 and/or other source.

At block 412, the security controller 120 determines a first security value based on the collected data (e.g., the low-power sensor data, the locational data, etc.). For example, the security controller 120 utilizes an AI algorithm to determine the first security value based on the collected data. At block 414, the security controller 120 determines whether the first security value is greater than a first predefined threshold. In response to the security controller 120 determining that the first security value is not greater than the first predefined threshold, the method 400 returns to block 402. Otherwise, in response to the security controller 120 determining that the first security value is greater than the first predefined threshold, the method 400 proceeds to block 416.

At block 416, the security controller 120 sets one or more of the high-power sensors 114 in an activated state. In some examples, the security controller 120 determines which of the high-power sensors 114 to set in the activated state based on the charge level of the battery 104. For example, the security controller 120 activates more of the high-power sensors 114 when the charge level is high and less of high-power sensors 114 when the charge level is low. At block 418, the security controller 120 collects data via the high-power sensors 114 that are active.

At block 420, the security controller 120 determines a second security value based on the collected data (e.g., the high-power sensor data, the low-power sensor data, the locational data, the first security value, etc.). For example, the security controller 120 utilizes the AI algorithm to determine the second security value based on the collected data. In other examples, the security controller 120 sends the collected data to a remote device (e.g., the remote server 314, the mobile device 318), and a processor of the remote device (e.g., the processor 320, the processor 324) utilizes an AI algorithm to determine the second security value based on the collected data. At block 422, the security controller 120 and/or the processor of the remote device determines whether the second security value is greater than a second predefined threshold. In response to the security controller 120 and/or the remote device processor determining that the second security value is not greater than the second predefined threshold, the method 400 returns to block 402. Otherwise, in response to the security controller 120 and/or the remote device determining that the second security value is greater than the second predefined threshold, the method 400 proceeds to block 424.

At block 424, the security controller 120 and/or the remote device stores the collected data in memory (e.g., the memory 312, the memory 322, the memory 326) to be accessed at a later time to facilitate identification of a perpetrator. Additionally or alternatively, at block 426, the security controller 120 and/or the remote device sends an alert in real-time to an operator of the vehicle and/or a third-party security service to prevent and/or curtail the crime and/or other security event. At block 428, the security controller 120 sets the high-power sensors 114 in a deactivated state after a predefined duration of time has been reached since activating the high-power sensors 114.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   low-power sensors and high-power sensors for security monitoring;
   a communication module; and
   a controller to:
   when in a key-off state, determine a first score based on the low-power sensors;
   responsive to the first score exceeding a first threshold, activate the high-power sensors;
   determine a second score based on the high-power sensors; and
   responsive to the second score exceeding a second threshold, send an alert via the communication module.

2. The vehicle of claim 1, further including an ignition switch and an ignition switch sensor, wherein the controller is to determine when the vehicle is in the key-off state based on the ignition switch sensor.

3. The vehicle of claim 1, further including a battery and a battery sensor to measure an energy level of the battery.

4. The vehicle of claim 3, wherein the high-power sensors are deactivated when the vehicle initially is in the key-off state to conserve energy consumption of the battery.

5. The vehicle of claim 3, wherein the controller determines which of the low-power sensors to activate based on the energy level of the battery.

6. The vehicle of claim 3, wherein the controller determines which of the high-power sensors to activate based on the energy level of the battery.

7. The vehicle of claim 6, wherein the controller is to identify a location of a security event based on data collected by the low-power sensors and determine which of the high-power sensors to activate based on the location.

8. The vehicle of claim 1, wherein:
   the low-power sensors include at least one of a microphone, an accelerometer, an ultrasonic sensor, a surface nanosensor, and a low-power camera; and
   the high-power sensors include at least one of a radar sensor, a lidar sensor, and a camera.

9. The vehicle of claim 1, wherein the low-power sensors and the high-power sensors are configured to monitor an exterior of the vehicle, an adjacent vehicle, and an adjacent building.

10. The vehicle of claim 1, further including a GPS receiver to identify a location of the vehicle, wherein the controller is to:
    collect security data for the location via the communication module;
    determine the first score further based on the location; and
    determine the second score further based on the location.

11. The vehicle of claim 1, further including memory configured to store a recording of a security event in response to the controller determining that the second score exceeds the second threshold.

12. The vehicle of claim 1, wherein the controller activates the high-power sensors for a predefined duration responsive the first score exceeding the first threshold and deactivates the high-power sensors when the predefined duration has been completed.

13. A system comprising:
    a vehicle including:
      low-power sensors;
      high-power sensors; and
      a controller to:
        when in a key-off state, determine a first score based on the low-power sensors;
        activate the high-power sensors based on the first score; and
        transmit data of the high-power sensors; and
    a remote device to:
      determine a second score based on the data; and
      transmit an alert based on the second score.

14. The system of the claim 13, wherein, to activate the high-power sensors based on the first score, the controller is to activate the high-power sensors responsive to determining that the first score exceeds a first threshold.

15. The system of the claim 14, wherein, to transmit the alert based on the second score, the controller is to activate the transmit the alert responsive to determining that the second score exceeds a second threshold.

16. The system of claim 13, wherein the remote device includes a remote server.

17. The system of claim 13, wherein the remote device includes a mobile device.

18. The system of claim 13, wherein the vehicle includes a communication module and the controller transmits the data of the high-power sensors via the communication module.

19. The system of claim 13, wherein the remote device includes memory configured to store a recording of a security event in response to the remote device determining that the second score exceeds a second threshold.

20. A method comprising:
    when a vehicle is in a key-off state, determining, via a processor, a first score based on data collected by a vehicle low-power sensor;

activating a vehicle high-power sensor upon determining, via the processor, the first score exceeds a first threshold;

determining a second score based on data collected by the vehicle high-power sensor; and sending an alert upon determining the second score exceeds a second threshold.

\* \* \* \* \*